United States Patent
Edwards et al.

(10) Patent No.: US 10,131,441 B2
(45) Date of Patent: Nov. 20, 2018

(54) AIRCRAFT ELECTRICAL NETWORK

(71) Applicant: ROLLS-ROYCE PLC, London (GB)

(72) Inventors: Huw L. Edwards, Derby (GB);
Alexander C Smith, Derby (GB);
Judith M. Apsley, Derby (GB);
Charalampos Manolopoulos, Derby (GB)

(73) Assignee: ROLLS-ROYCE PLC, London (GB)

( * ) Notice: Subject to any disclaimer, the term of this patent is extended or adjusted under 35 U.S.C. 154(b) by 342 days.

(21) Appl. No.: 15/136,074

(22) Filed: Apr. 22, 2016

(65) Prior Publication Data
US 2016/0340051 A1 Nov. 24, 2016

(30) Foreign Application Priority Data

May 19, 2015 (GR) .............................. 20150100223
Jun. 23, 2015 (GB) .................................. 1511033.1

(51) Int. Cl.
*B64D 27/02* (2006.01)
*B64D 35/02* (2006.01)
*B64D 27/24* (2006.01)

(52) U.S. Cl.
CPC ............. *B64D 27/02* (2013.01); *B64D 27/24* (2013.01); *B64D 35/02* (2013.01); *B64D 2027/026* (2013.01); *B64D 2221/00* (2013.01); *Y02T 50/44* (2013.01); *Y02T 50/64* (2013.01)

(58) Field of Classification Search
CPC .......... B64D 2027/026; B64D 2221/00; B64D 27/02; B64D 27/24; B64D 35/02; B64C 25/405; B64C 11/30; Y02T 50/44; Y02T 50/64; Y02T 50/823; H02J 4/00
See application file for complete search history.

(56) References Cited

U.S. PATENT DOCUMENTS 4,051,671 A * 10/1977 Brewer ..................... F02C 3/32
60/262
4,056,568 A * 11/1977 Cisney .................. C07C 319/02
562/835

(Continued)

FOREIGN PATENT DOCUMENTS

| EP | 2 878 538 A1 | 6/2015 |
|---|---|---|
| EP | 2910739 A1 | 8/2015 |
| GB | 2493268 A | 1/2013 |

OTHER PUBLICATIONS

Dec. 20, 2015 Search Report issued in British Patent Application No. 1511033.1.

(Continued)

*Primary Examiner* — Medhat Badawi
(74) *Attorney, Agent, or Firm* — Oliff PLC

(57) ABSTRACT

An electrical network for an aircraft. The aircraft includes at least one variable pitch propulsor. The electrical network includes a wound field synchronous AC electrical generator having a wound rotor driven by an internal combustion engine. The network further includes a voltage regulator configured to regulate output voltage of the electrical generator by regulating rotor winding magnetic field strength, and a synchronous AC drive motor coupled to a respective variable pitch propulsor and provided with power from the output of the electrical generator.

14 Claims, 4 Drawing Sheets

(56) References Cited

U.S. PATENT DOCUMENTS

| | | | | |
|---|---|---|---|---|
| 4,091,613 A * | 5/1978 | Young | B64D 41/00 | 417/88 |
| 4,523,517 A * | 6/1985 | Cronin | B64D 13/06 | 237/2 A |
| 4,541,237 A * | 9/1985 | Dickey | F02C 9/28 | 60/39.281 |
| 4,605,185 A * | 8/1986 | Reyes | B64D 27/24 | 244/55 |
| 5,281,094 A * | 1/1994 | McCarty | B64C 11/44 | 318/722 |
| 5,309,029 A * | 5/1994 | Gregory | F01D 15/10 | 244/58 |
| 5,490,645 A * | 2/1996 | Woodhouse | B64D 13/06 | 244/118.5 |
| 5,899,411 A * | 5/1999 | Latos | B64D 33/00 | 244/53 A |
| 6,137,187 A * | 10/2000 | Mikhail | F03D 7/0224 | 290/44 |
| 6,142,418 A * | 11/2000 | Weber | B64D 41/00 | 244/17.19 |
| 6,296,957 B1 * | 10/2001 | Graage | B64D 41/00 | 429/425 |
| 6,778,414 B2 * | 8/2004 | Chang | H02J 3/34 | 363/67 |
| 6,834,831 B2 * | 12/2004 | Daggett | B64D 41/00 | 244/118.5 |
| 7,207,521 B2 * | 4/2007 | Atkey | B64D 13/06 | 244/58 |
| 7,210,653 B2 * | 5/2007 | Atkey | B64D 13/06 | 244/58 |
| 7,222,001 B2 * | 5/2007 | Frost | H01M 8/04559 | 429/432 |
| 7,431,238 B2 * | 10/2008 | Hoffjann | B64D 11/02 | 244/118.5 |
| 7,550,866 B2 * | 6/2009 | Breit | H02J 1/10 | 307/9.1 |
| 7,687,927 B2 * | 3/2010 | Shander | H02J 4/00 | 290/7 |
| 8,136,756 B2 * | 3/2012 | Duces | H02J 3/02 | 244/58 |
| 8,786,262 B2 * | 7/2014 | Rajashekara | H02P 21/06 | 322/25 |
| 9,096,312 B2 * | 8/2015 | Moxon | B64D 27/12 | |
| 9,729,096 B2 * | 8/2017 | Edwards | H02P 9/04 | |
| 9,789,768 B1 * | 10/2017 | Meier | B60L 8/003 | |
| 2004/0080300 A1 * | 4/2004 | Xu | F02C 7/268 | 322/59 |
| 2004/0118969 A1 * | 6/2004 | MacCready | B64C 1/26 | 244/5 |
| 2004/0124308 A1 * | 7/2004 | Daggett | B64D 41/00 | 244/58 |
| 2005/0151517 A1 * | 7/2005 | Cook | B60R 16/03 | 323/207 |
| 2007/0031303 A1 * | 2/2007 | Kaiser | F02K 9/50 | 422/177 |
| 2007/0267540 A1 * | 11/2007 | Atkey | B64D 13/06 | 244/58 |
| 2007/0284480 A1 * | 12/2007 | Atkey | B64D 13/06 | 244/135 R |
| 2008/0143182 A1 * | 6/2008 | Raju | B60L 11/08 | 307/26 |
| 2008/0150356 A1 * | 6/2008 | Breit | H02J 1/10 | 307/9.1 |
| 2008/0157529 A1 * | 7/2008 | Rivas | H02P 9/007 | 290/44 |
| 2008/0184906 A1 * | 8/2008 | Kejha | B64C 39/024 | 102/374 |
| 2009/0127855 A1 * | 5/2009 | Shander | H02J 4/00 | 290/7 |
| 2009/0243417 A1 * | 10/2009 | Xu | H02K 7/20 | 310/184 |
| 2010/0090641 A1 * | 4/2010 | Oyake | H02P 1/50 | 318/716 |
| 2010/0193630 A1 * | 8/2010 | Duces | H02J 3/02 | 244/58 |
| 2010/0259859 A1 * | 10/2010 | Prabhu K | H02H 7/30 | 361/62 |
| 2011/0024567 A1 * | 2/2011 | Blackwelder | B64D 15/12 | 244/134 D |
| 2011/0039171 A1 * | 2/2011 | Hibbs | H01M 8/04097 | 429/417 |
| 2011/0198918 A1 * | 8/2011 | Langlois | B64D 41/00 | 307/9.1 |
| 2012/0138737 A1 * | 6/2012 | Bruno | B64D 41/00 | 244/58 |
| 2014/0138479 A1 * | 5/2014 | Vieillard | B64C 25/405 | 244/50 |
| 2015/0013306 A1 * | 1/2015 | Shelley | F02K 5/00 | 60/224 |
| 2015/0042155 A1 * | 2/2015 | Vieillard | B60R 16/0307 | 307/9.1 |
| 2016/0340051 A1 * | 11/2016 | Edwards | B64D 27/02 | |

OTHER PUBLICATIONS

Kim et al; "Distributed turboelectric propulsion for hybrid wing body aircraft;" 2008 International Powered Lift Conference; Jul. 2008; pp. 1-11.

* cited by examiner

AIRCRAFT ELECTRICAL NETWORK

FIELD OF THE INVENTION

The present invention relates to an aircraft electrical network and a method of controlling the aircraft electrical network.

BACKGROUND TO THE INVENTION

Aircraft having electrical propulsors have been proposed, in which electrical power generated by a gas turbine engine driven electrical generator is used to power an electrical motor, which in turn drives a propulsor such as a fan or propeller to power the aircraft in flight. Studies such as "Distributed Turboelectric Propulsion for Hybrid Wing Body Aircraft" by Hyun Dae Kim, Gerald V Brown and James L Felder, published by the Royal Aeronautical Society, have shown that such systems may provide efficiency savings in some instances, as large numbers of propulsors can be used, which increases the overall efficiency of the aircraft. However, inefficiencies in the electrical network can in some cases negate these advantages. Such inefficiencies include the weight of the associated generators, power electronics devices and motors, and power losses in electrical transmission, frequency control by the power electronics, and conversion between mechanical and electrical power by the generators and motors.

AC electrical generators, motors and transmissions are known to have high transmission and conversion efficiencies. However, in order to provide variable motor speed to in turn provide variable propeller or fan rotational speed (and so provide variable thrust over a range of aircraft forward flight airspeeds), power electronics units are generally required in order manage the frequency of electrical power delivered to the electrical motors to ensure synchronisation of applied and rotor fields, and also to control the applied voltage which can impact motor efficiency. Where the electrical motors comprise synchronous motors, power electronics are also required for motor starting, as large synchronous motors generally have large inertia, and so are not self-starting—due to the requirement for the applied stator field and the rotor speed to be synchronised (otherwise continuous rotation is not achieved and pole slipping or cogging may occur). However, power electronics units are generally heavy, inefficient and expensive. The need for power electronics in the electrical network rated to the full power required by the propulsor driving motors at full thrust may therefore result in disadvantages that outweigh the advantages provided by electrical propulsion.

The present invention seeks to provide an aircraft electrical network for an aircraft and a method of starting an electrical motor powered by the electrical network which seeks to overcome some or all of the above problems.

SUMMARY OF THE INVENTION

According to a first aspect of the present invention, there is provided an aircraft comprising an electrical network, the aircraft comprising at least one variable pitch propulsor, the electrical network comprising:

a wound field synchronous AC electrical generator having a wound rotor driven by an internal combustion engine;

a voltage regulator configured to regulate output voltage of the electrical generator by regulating rotor winding magnetic field strength; and a synchronous AC drive motor coupled to a respective variable pitch propulsor and provided with power from the output of the electrical generator.

Accordingly, the invention provides a highly efficient electrical network capable of driving an AC drive motor to drive a variable pitch propulsor. It has surprisingly been found by experiments conducted by the inventors that, by providing a wound field synchronous AC generator and one or more synchronous AC motors driving variable pitch propulsors, synchronisation of the generator and motors can be maintained in flight, with thrust being controllable by a combination of internal combustion engine throttling to adjust generator output frequency and power, electrical generator output voltage control, and variable propulsor pitch. The electrical network enables starting and running of the AC drive motor without the requirement for power electronics, thereby increasing electrical efficiency and reliability, while reducing system weight.

The drive motor may comprise a permanent magnet motor. Advantageously, the drive motor has a high efficiency, in particular relative to an asynchronous motor such as an induction motor.

The electrical network may comprise one or more frequency converters configured to convert an input frequency generated by the synchronous AC generator to an output frequency provided to the or each drive motor. Each frequency converter may be rated to a lower power than the rated power of the respective drive motor or to a lower power than the total of the rated powers of the drive motors to which the respective frequency converter is coupled.

The electrical network may comprise a switching arrangement configurable to either of a starting position, in which the or each drive motor is electrically coupled to the electrical network via the one or more frequency converters, and a drive position, in which the or each drive motor is directly electrically coupled to the electrical generator. Advantageously, the drive motors can be driven either directly by power at the frequency provided by the generator, or via the frequency converter. It has been found that in some instances (such as for starting), it may be necessary for the drive motor to be powered by the frequency converter (i.e. power electronics) in order to achieve synchronous control at drive motor speeds different to the synchronous speed corresponding to the electrical network frequency (i.e. when the applied field to the stator is different to corresponding motor electrical frequency—where the motor's electrical frequency is determined by its pole number and rotor speed). However, such power electronics will generally be rated at lower power than where power electronics are required for all motor operation, and so the weight of the power electronics would be expected to be lower.

The propulsor may comprise one of a variable pitch fan and a variable pitch propeller. The electrical network may comprise a controller. The controller may be configured to control the electrical network such that, when in the starting position, the variable pitch propulsor is set to a fine pitch and the switching arrangement is configured to the starting position. With the propeller pitch at fine pitch, the inventors have found during experiments that the load applied to the drive motor is approximately 10% of the maximum load when the propeller is in coarse pitch. With this reduced load, the frequency converter can be rated at roughly 10% of the motor's full rating, and is capable of accelerating the motor and attached propulsor to its operating speed range, typically around half of its maximum speed and above (e.g. >10000 rpm for a 20000 rpm maximum speed motor). When operated in this mode, direct power from electrical generator at the electrical generator output frequency must be disconnected from the stator, otherwise the frequency converter will not be able to control the field. After a period of time, the motor is synchronised to the electrical network frequency and the starter power electronics can be bypassed, and the variable pitch increased from fine pitch.

Each drive motor may comprise at least one stator comprising three electrical phases. Each drive motor may comprise first and second stators, the first stator having electrical phases independent from the second stator. The frequency converter may be selectively electrically coupled to the second stator electrical phases. The controller may be configured to energise the first and second stators in the drive position, and energise only the second stator in the starting position. Advantageously, independent stator windings are provided for starting, while these starter windings may also contribute to torque during normal operation once stared. Advantageously the parameters of the inverter and starter windings can be optimised for starting, to increase the start rate, and reduce the inverter power rating required.

The or each frequency converter may be electrically coupled to a plurality of drive motors. Advantageously, the number of frequency converters is reduced. This is possible, since the frequency converters are only required during starting or abnormal condition resynchronisation, and so redundancy is not required.

The electrical generator may comprise a wound field generator with an exciter control system. The exciter control system may comprise a brushless wound field machine. The exciter control system may be configured to vary the rotor field strength to control the output voltage of the generator independently of the input rotational speed. The internal combustion engine may comprise one of a gas turbine engine and a piston engine. The electrical network may comprise a plurality of propulsors, and may comprise a plurality of electrical generators. The electrical network may comprise sufficient electrical interconnections, switches/contactors and buses to enable power generation and loads to be reconfigured in the event of a failure (isolation of failure components and reconfiguring power delivery to high priority loads), such as a generator failure.

The stator of the or each synchronous generator may comprise the same number of magnetic poles as the or each stator of the or each drive motor. Advantageously, the generator and drive motors will operate at the same rotational speed once synchronised. Alternatively, the stator of the or each synchronous generator may comprise a different number of magnetic poles to the or each stator of the or each drive motor. Advantageously, the electrical network may act as a "gearbox", providing a gear ratio between the rotation of the electrical generators and the drive motors, through the appropriate selection of generator and motor pole numbers.

According to a second aspect of the present invention, there is provided a method of controlling an electrical network in accordance with the first aspect of the present invention, the method comprising:

modulating the generator output voltage such that the phase angle of the induced EMF and current phasors in the or each drive motor is minimised.

It has been found that it is possible to provide v/f control of the synchronous motors by modulating generator output voltage, thereby providing highly efficient operation of the drive motors. In the case of an aircraft propulsion system the slower V/f control by a wound field generator (compared to that of a frequency converter/power electronics) is sufficient since the response time of the internal combustion engine to reach full power may be of the order of several seconds. The method of matching V/f can be applied throughout the operating speed range of the drive motors, to maximise efficiency for example during cruise, and maximise torque and therefore power at take-off. Though the wound field machine excitation system may not be able to control voltage as rapidly as frequency changes, an important consideration is that when in a stable operating mode such as cruise, voltage is at its optimum point for efficiency.

According to a third aspect of the present invention, there may be provided a method of controlling an electrical network in accordance with the first aspect of the present invention, the method comprising:

operating the electrical network in one of at least a starting mode and a flight mode, wherein when in the starting mode the or each drive motor is electrically coupled to the electrical network via the one or more frequency converters and the or each propulsor is set to fine pitch, and when in the drive mode, the or each drive motor is directly electrically coupled to the electrical generator.

The method may further comprise operating the electrical network in an inflight re-synchronisation mode, wherein the stator windings of the drive motor are disconnected from the electrical network, the rotor pitch is set such that the propulsor is caused to rotate at a speed such that the motor is synchronised with the electrical generator output frequency, and the stator windings are subsequently reconnected once the motor achieves synchronisation. In this scenario the frequency converters may be reconnected to the drive motor to aid with the resynchronisation, or alternatively the pitch control could be set to minimise the load and the frequency converters solely control the resynchronisation process (with no windmill assist).

Where the electrical network comprises a plurality of generators and a plurality of propulsors, the method may further comprise operating the electrical network in a load shedding mode, wherein, where a generator failure is detected, one or more propulsors is operated in fine pitch to reduce the electrical load on the electrical network. The reduction in pitch has the benefit of aiding the transfer of additional motor loads to the remaining functioning generators. The reason for this change in pitch (and therefore torque required from the motors) is to reduce the current drawn during the transfer, to reduce the transient when the motor is added to the generator. This in particular relates to voltage stability and the rate at which the exciter system can respond to the additional loads, the subsequent increase in current, and the inevitable increase in voltage increase over the generators internal resistance which will act to bring down the terminal voltage. By reducing pitch before the transfer the generator will be better placed to handle the transfer and the voltage controller will have more time to respond. These transfers could be controlled automatically, assuming the transient is short (less 1-2 seconds), or at the request/control of the pilot.

DETAILED DESCRIPTION

Figure 1:
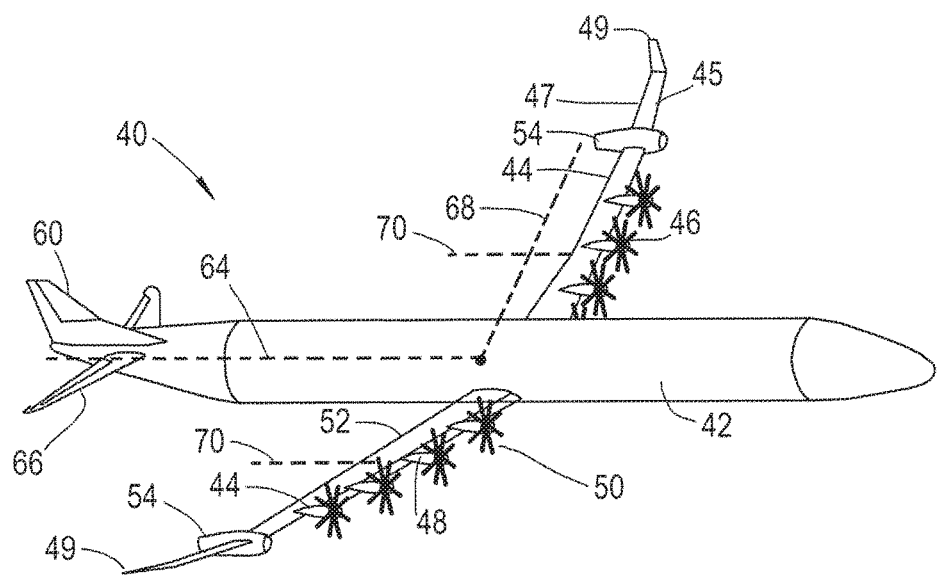
FIG. 1 shows schematic perspective view of an aircraft having an electrical network in accordance with the present invention.

Referring to FIG. 1, a first aircraft 40 is shown. The aircraft comprises a fuselage 42, a pair of wings 44 extending therefrom generally normal to the fuselage 42, and an empennage located at an aft end of the fuselage 42. The empennage comprises vertical and horizontal tailplanes 60, 66.

A wingspan is defined by the distance between wing tips 49. Each wing 44 comprises a leading edge 45 and a trailing edge 47, which together define a chord extending therebetween. The ratio between the wingspan and chord length defines an aspect ratio. As can be seen from FIG. 1, the chord length varies along the wing span, from a relatively large chord at the wing root adjacent the fuselage 42, to a relatively small length at the wing tips 49. In cases such as this where the chord varies along the span, the aspect ratio AR can be defined as the square of the wingspan b divided by the area S of the wing planform:

$$AR = \frac{b^2}{S}$$

In the example shown in FIG. 1, the aspect ratio is approximately 25, though higher aspect ratios such as aspect ratios up to 30 or more may be achieved. In other cases, lower aspect ratios may be desirable, such as where the aircraft comprises a short takeoff and landing aircraft (STOL). Each wing 44 preferably further comprises a deployable high lift device in the form of flaps 52 located at the trailing edge 47 of each wing 44. Optionally, the deployable high lift device may include one or more slats (not shown) located at the leading edge 45 of the wing. The flaps 52 are selectable between a stowed position (as shown in FIG. 1) and a deployed position, in which the flaps 52 increase the lift coefficient of the wing 44 compared to when the flaps 52 are in the stowed position. The deployable high lift devices may be deployable to intermediate positions between the deployed and stowed positions.

A plurality of propulsors 46 is provided on each wing 44, which provide thrust to drive the aircraft forward. The plurality of propulsors 46 on each wing together define a centre of thrust 70, i.e. a notional line extending rearwardly from the centre of the airflow provided by the propulsors 46 on that wing 44. In the described embodiment, four propulsors are provided, though more or fewer propulsors may in some cases be provided. The relatively large number of propulsors 46 enables a relatively large propulsor disc area to be employed. Consequently, the propulsors are highly efficient and relatively quiet, without requiring excessive ground clearance, which thereby reduces the length of the undercarriage.

Each propulsor 46 comprises an electric motor arrangement (described in further detail below) housed within a nacelle 48, and a propeller 50 driven by the motor, though other forms of propulsors such as electrically driven ducted fans could be employed. Each propeller 50 is located forward of the leading edge 45 of the wing 44, and is mounted to the wing 44 by the nacelle 48. The propellers 50 are variable pitch, comprising a pitch controller 118 (shown in FIG. 2) to control the propeller 50 between fine pitch (in which the propeller blades are oriented with their leading edges substantially facing the plane of rotation) and coarse pitch (in which the propeller blades are oriented with their leading edges substantially normal to the plane of rotation), and pitches in between. In use, the propellers 50 rotate to provide airflow, and therefore thrust. As the propellers 50 are located forward of the leading edge 45, the airflow travels over the portion of the wing 44 located behind the respective propellers 50, and in particular over the flaps 52. This airflow increases the effective airflow over the wing 44, thereby increasing the coefficient of lift (CL) when the propellers 50 are turning, and particularly where the flaps 52 are extended. The propellers 50 are relatively closely spaced, such that the propellers 50 provide airflow over a large proportion of the wing 44, and particularly, the portion of the wing on which the flaps 52 are located.

In the described embodiment, the maximum coefficient of lift of each wing 44 when the flaps 52 are deployed, and the propulsors 46 are at maximum power ($CL_{max(power\ on)}$) is approximately twice the maximum coefficient of lift of each wing 44 when the propulsors 46 are at minimum power ($CL_{max(power\ off)}$), i.e. when the propulsors 46 are turned off. Consequently, the propulsors 46 substantially increase the amount of lift generated by the wings 44, thereby reducing the wing area required for a given amount of lift, or increasing the amount of lift for a given wing area.

Each wing further 44 comprises a generator arrangement 54 comprising an internal combustion engine in the form of an internal combustion engine 10 and an electrical power generator 56. In the described embodiment, a single generator arrangement is provided on each wing 44, though further generator arrangements could be provided. The internal combustion engine 10 drives the electrical power generator 56 to provide electrical power. An electrical energy storage device such as a capacitor, chemical battery or hydrogen fuel cell (not shown) might also be included, which could be charged by the internal combustion engine, and provide power to the propulsors for a short period on engine failure or to improve performance for short duration flight segments such as e.g. takeoff or climb.

Figure 2:
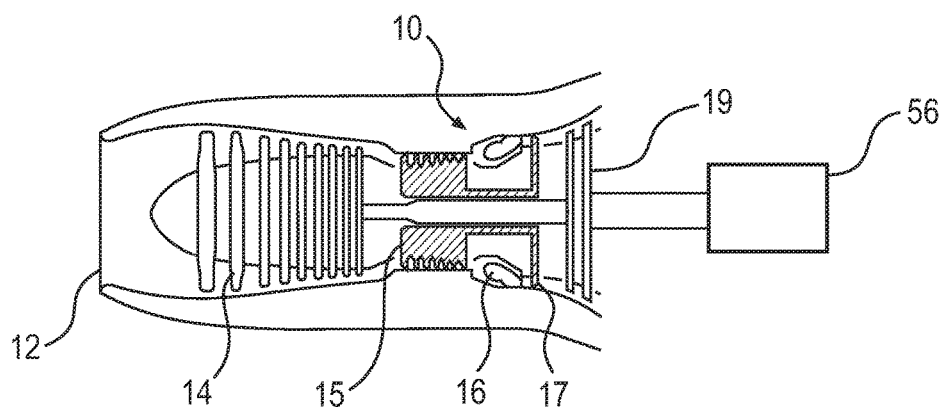
FIG. 2 shows a schematic cross sectional view through a gas turbine engine of the aircraft of FIG. 1.

Referring to FIG. 2, each internal combustion engine in the form of a gas turbine engine 10 comprises an air intake 12 that generates an airflow. The internal combustion engine 10 comprises, in axial flow, a low pressure compressor 14, a high pressure compressor 15, a combustor 16, a high pressure turbine 17, an intermediate pressure turbine, and a low pressure turbine 19. The high pressure turbine 17 is coupled to the high pressure compressor 15, to thereby drive the compressor 15 in use. Similarly, the low pressure turbine 19 is coupled to the low pressure compressor 14, to thereby drive the compressor 14 in use the low pressure turbine 19 is also coupled to an electrical generator 56, described in further detail below.

Figure 3:
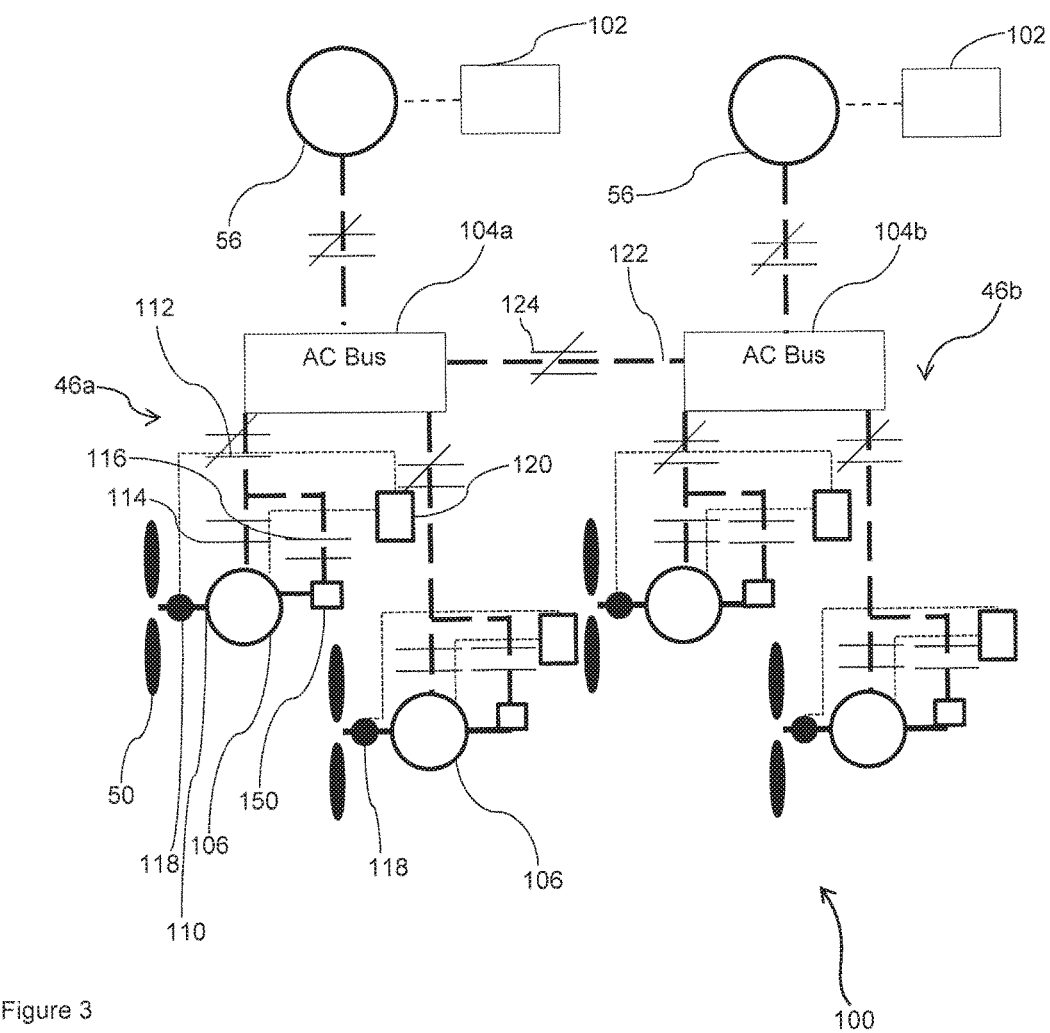
FIG. 3 shows an electrical schematic drawing of an electrical network of the aircraft of FIG. 1.
Figure 4:
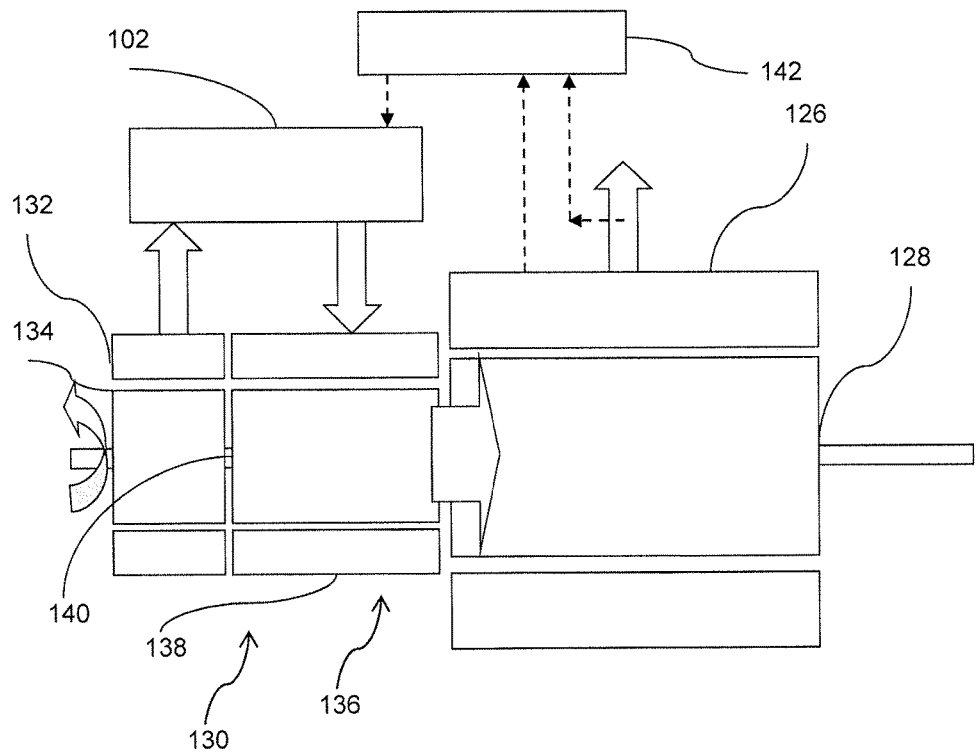
FIG. 4 shows a schematic drawing of a component of the electrical network of FIG. 3.

FIG. 3 shows an electrical network 100 in accordance with the present disclosure, suitable for use with the aircraft 40 shown in FIG. 1. The network 100 includes a pair of electrical generators 56, which are each driven by a respective gas turbine engine 10. Each of the generators comprises a wound field AC generator 56, with a rotor field control system (often referred to as an exciter). A schematic drawing of one of the generators 56 is shown in FIG. 4. Each generator 56 comprises a stator 126 having a plurality of stator windings arranged in multiple phases (in the embodiment shown, the stator 126 has three phases), and a rotor 128 comprising field windings energised by an exciter 130. The exciter 130 in turn comprises an exciter stator 132 comprising windings, and a permanent magnet rotor 134. The rotor 134 is configured to rotate and thereby energise the windings of the stator 132 to generate an AC current in the stator windings 132. This AC current is sent to a voltage regulator 102 which is configured to receive the power/voltage provided by the exciter 130, and provide a controlled voltage to a stator 138 of a rotating transformer 136. The stator 138 of the rotating transformer is energised by the AC power received from the voltage regulator 102, which produces a rotating magnetic field. This magnetic field induces an electrical current in windings of a rotor 140 of the transformer 136. This electrical current is converted to DC power in the rotor by a rotating set of diodes configured as a rectifier, which in turn energises the windings of the main rotor 128 of the generator. Consequently, the voltage in the field windings of the rotor 128 of each generator 56 is controlled by the Voltage Regulator (AVR) 102. The output voltage produced by the stators 126 of the respective generator 56 is monitored using sensors 142, and the input voltage of the exciter is adjusted to thereby regulate the magnetic field strength of the rotor 128 field windings, to thereby maintain the output voltage of the generator 56 at a desired required RMS voltage in a feedback loop. The desired RMS voltage is determined using "v/f control", where the applied voltage and frequency is controlled to a given ratio. This for example helps reduce the internal power factor by mitigating (i.e. minimising) the phase angle between the induced EMF and phase current. The ratio of V/F can be varied slightly to optimise the machine for different part power scenarios, for example by reducing the increasing the voltage, to reduce the required current (and in turn the resistive losses).

Each generator 56 provides AC power to a respective AC electrical bus 104. Each AC bus 104 in turn supplies power to a plurality of propulsor arrangements 46, two of which (46a, 46b) are shown in FIG. 3 for clarity. Though not shown for clarity, each engine generally has more than one generator, with their own buses and loads such as propulsors, and interconnectors to enable power source and load reconfiguration in the event of failures. Also not shown are other smaller loads such as aircraft "hotel" loads (power for flight computers or galleys). For such hotel loads, sufficient power conversion would be required to ensure power quality requirements are met, such as frequency and voltage restrictions, or the loads are adapted to accept the power delivered by the main propulsion network. It may be simpler to include additional generators for aircraft loads to free up the propulsion network from power quality restrictions, or filtering requirements.

Figure 5:
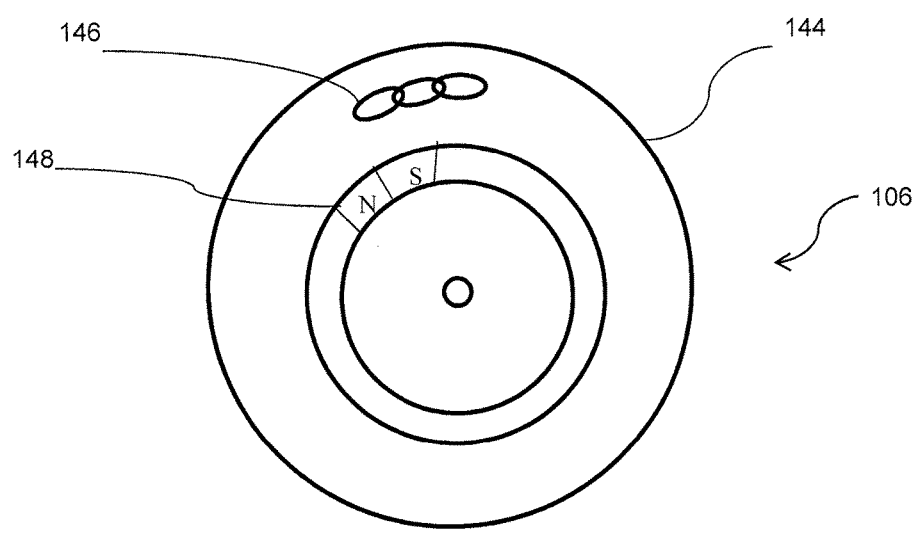
FIG. 5 shows a schematic drawing of a further component of the electrical network of FIG. 3.

Each propulsor arrangement 46 comprises a drive motor in the form of a synchronous AC motor 106 comprising a stator 144 having stator windings 146, and a permanent magnet rotor 148, as shown in FIG. 5.

The synchronous AC motor 106 is coupled to a propeller 50 of the propulsor arrangement 46 by a shaft 110. Motor 106 is supplied with electrical power from the AC bus 104 a shutoff switch 112 (typically a circuit breaker, solid state power controller) which can be used to selectively provide power to the motor 106. A further connection to the motor 106 stator phase windings is included via a frequency converter in the form of a motor drive 150. Each motor drive 150 comprises a power electronics unit configured to receive input power from the generator 56 via bus 104 at an input frequency, and convert this to an output frequency generally having a different frequency. Such a device is often referred to as a "motor drive" or "motor controller", and can be used to control the speed of synchronous AC motors.

The motor drive 150, is a partially rated power converter whose output has variable frequency & voltage, the ratio of which is controlled by a system level controller that optimises for overall drive system efficiency. Motor drive 150 is also designed to handle the variable voltage and frequency power delivered from the generator 102. The motor drive 150 has sensor signals inputted to it from the motor 106, such as frequency or speed, to enable synchronisation. In addition, the motor voltage is also required to enable the applied voltage from motor drive 150 to be matched, and to ensure that the motor voltage matches the network voltage (within limits) prior to direct connection to the network bus (i.e. bypass of motor drive 150).

A switching arrangement comprising electrical switches 114, 116 is also provided, which can be used to selectively provide power to the motor 106 via either the frequency converter 150 or direct from the generator 56 via the bus 104 to allow control of motor 106 and bus 104b synchronisation. An AC interconnector 122 is provided, which electrically couples the AC busses 104a, 104b together. Power transfer between the busses 104a, 104b can be enabled/disabled by a switch 124. In failure mode scenarios the generators could either be over-rated (i.e. operated at greater than 100% of their rated power) to handle an increased peak load (with more motors now connected to them), or the aircraft could be designed to accept a failure mode where each motor delivers a reduced peak power. Any transfer of power would need to consider the transient impact of suddenly switching in an additional motor. The generator and voltage controller will need to be sized and designed to operate fast enough to handle the increase in current and subsequent increase in the voltage drop over the generators internal resistance. Advantageously the pitch control system can be used to mitigate the transient, by reducing the pitch before the motor is added to reduce the transient current spike and give the voltage controller more ability to respond before voltage stability limits are surpassed. This could be furthered to include reducing the pitch on all the motors attached to the generator (i.e. not just the additional motor/s being added following a failure). It is desirable to do such reconfiguration due to the nature of the proposed aircraft and the interaction of the propulsors with the wing. I.e. it is preferable to retain symmetry in thrust over the wings to reduce impact on aircraft control (yaw and roll).

A controller 120 is provided for each propulsor arrangement 46, which is in signal communication with the pitch controller 118 and switches 112, 114, 116. Rotation sensors (not shown) are also provided, which sense the rotational speed of each of the propeller 50, and motors 106, and provide a signal to the controller 120. An AC bus electrical frequency sensor (not shown) is also provided, which senses the electrical frequency of power provided by the bus 104, and provides a signal to the controller 120.

Figure 6:
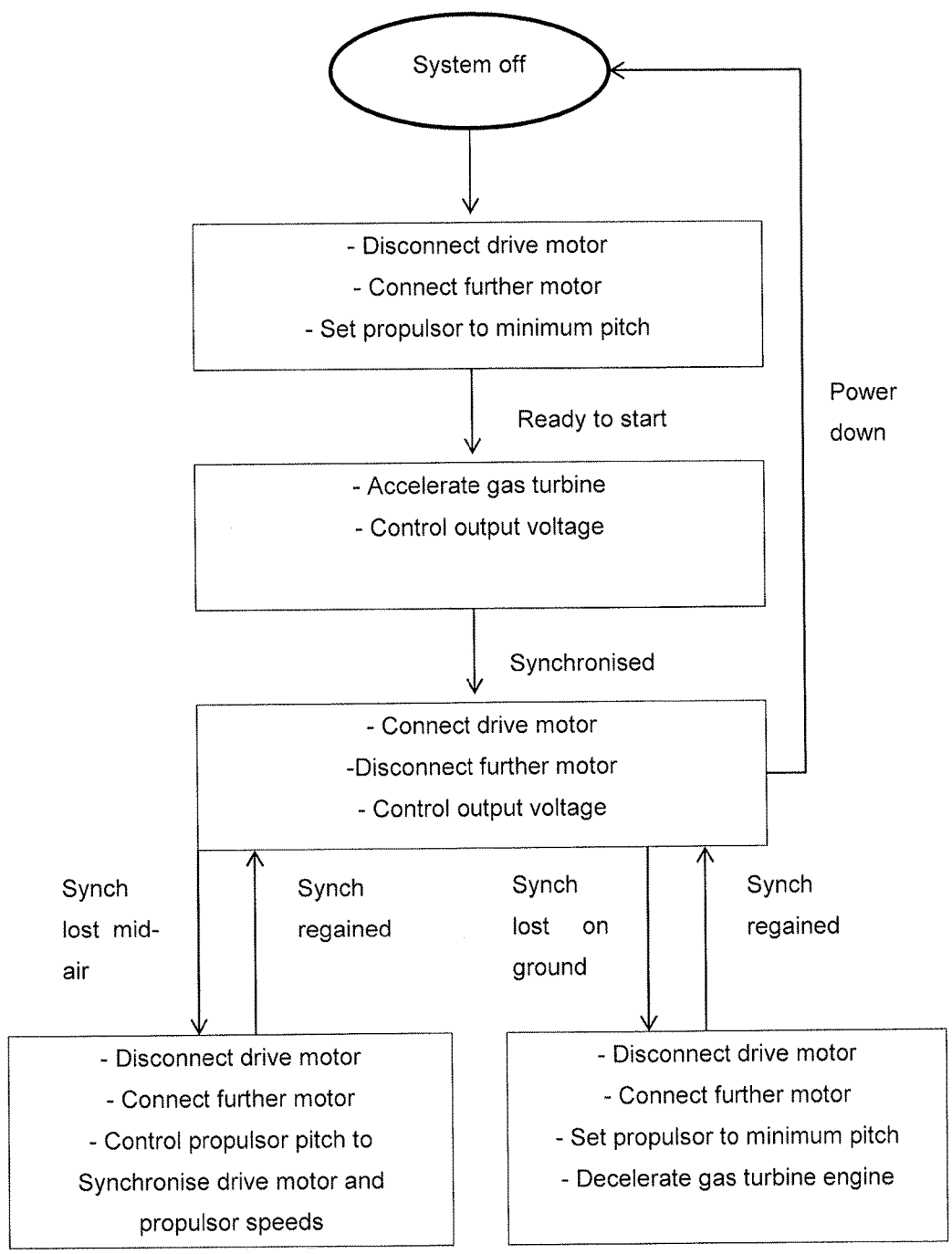
FIG. 6 shows a flow diagram illustrating a method of controlling the electrical network of FIG. 3.

FIG. 6 is a flow diagram, which illustrates one method of operating the propulsor arrangement 46. With the gas turbine engine 10 running, the aircraft 40 on the ground, and the propeller 50 stationary, a signal is received by each controller 20 (from, say, an aircraft controller (not shown)), to set the propulsor arrangement to a starting mode, to start the respective propeller 50. The controller 120 closes switch 112, and opens switch 114 to electrically disconnect the drive motor 106 from the bus 104, and closes switch 116 to electrically connect the drive motor 106 to frequency converter 150. The controller 120 further sends a signal to the pitch actuator 118 to turn the propeller blades of the propeller 50 to fine pitch, to thereby reduce the load on motor 106. Power is transferred to the motor 106, via frequency converter 150 which thereby turns both the propeller 50, and the rotor of the drive motor 106.

Once the rotor speed of the drive motor 106 is synchronised with the frequency of the main bus 104, the controller switches the electrical network to a flight mode, in which the frequency converter 150 is disconnected from the drive motor 106 by actuating switch 116, and the motor 106 connected to the bus 104 by actuating switch 114. Then the propeller pitch and gas turbine 10 can be operated as needed, with the electrical system in a passive mode, where it can be considered as a shaft between the gas turbine 10 (where the generator main stator 126 has the same pole number as the motor 106 stator) or alternatively as a gearbox (where the generator main stator 126 has a different pole number as the motor 106 stator). The AVR 102 regulates the output voltage of the generator 56 to maintain the output voltage within acceptable limits. Typically this is achieved by applying a known voltage for a given applied frequency (V/f control). Alternatively this can be achieved by measuring the internal EMF of the motor using an appropriate sensor (for example a hall probe), and comparing its phase angle with the current (from the current transformer) and adjusting the applied voltage accordingly.

Once started, the controller 120 continually monitors synchronicity between the electrical current from the bus 104 and the drive motor 106. If the motor 106 is found not to be synchronous (or nearing predefined limits), the controller 120 switches to a re-synchronisation mode, in which the controller 120 re-synchronises the motor 106 in accordance with one of two methods, depending on whether the aircraft is in flight (or at high speed on the ground), or is stationary (or at low speed).

When in flight, the variable pitch system can be used to resynchronise the motor, by first disconnecting the power from the motor stator 144 (otherwise as the rotor 148 is accelerated by windmilling, it will interact with the stator field and the permanent magnet field, creating large undesirable torque oscillations). Then by using wind milling, the rotor speed is synchronised with the main network frequency, accelerating the rotor 148 from a speed below synchronous speed to one near or slightly above synchronous speed. The motor drive 150 would then be used to synchronise the frequency, voltage and phase angle to achieve final synchronisation. Main power can then be reconnected to the stator, and the rotor will lock on and synchronise. Full load can then be applied by changing the propeller pitch. Alternatively the motor drive could be used to resynchronise the motors, with the propeller pitch merely set to provide minimum torque resistance.

As will be understood, while the propulsor drive motor 106 is being re-synchronised, that propulsor will no longer generate thrust. Consequently, where a plurality of propulsors are provided on each wing, asymmetric thrust may be produced. To counteract this, the propulsors on the opposite side of the aircraft may commanded to provide an decrease in thrust. Consequently, asymmetric thrust is quickly reduced.

Alternatively the variable pitch can be put to minimum and the starter power electronics used much in the same way as before. Alternatively again the power electronics and propeller pitch control can be used to jointly accelerate the motor.

Where the aircraft 40 is on the ground, the drive motor 106 is again disconnected using switch 114, and the frequency converter 150 is connected using switch 116. However, in this case, the propeller 50 is set to fine pitch to minimise the load. The gas turbine engine 10 may also be decelerated, in order to reduce the AC current frequency on bus 104, and thereby re-match the AC current frequency to the drive motor 106 rotational frequency.

Consequently, the invention provides an aircraft electrical network which is lightweight, efficient and reliable.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, while the electrical network has been described in relation to an example aircraft, different aircraft configurations could be appropriate. For example, the propulsors could be located in different positions on the aircraft, such as at a rearward position on the wing or the fuselage, with the propulsors ingesting boundary layer airflow.

The motors coupled to the propulsors could be coupled via a gearbox configured to provide a reduction gear between the motor and propulsor.

Additionally the motors and generators could be fault tolerant with multiple sets of 3 phase windings in the stators. Where loss of one set in a "double 3 phase motor" would still be capable of 50% power. Alternatively the motors and generators could adopt a fault tolerant phase methodology, typically with more than 2 phases, but not necessarily multiples of 3, such as a 5 phase machine. Here each phase could be independently driven by their own power electronic drive unit, or subsection of a unit. To achieve fault tolerance each phase could be magnetically, thermally and electrically isolated from each other.

The networks could include switching and interconnects enabling the sharing of the power between the remaining generators following a generator failure. This could include paralleling the buses together to share the burden.

The system could include a disconnection arrangement configured to disconnect a propulsor from a respective electrical drive motor in the event of a drive motor failure, to prevent windmilling of the propulsor from overheating the motor. For example, the drive motor and propulsor could be coupled by a frangible link, or could be coupled via a clutch. Alternatively or in addition, the controller may be configured to configure the respective propulsor to fine pitch in the event of a motor failure, to reduce the rotational speed and/or load on the motor.

The drive motors may comprise a health monitoring system configured to detect a failure. For example, each drive motor may comprise a temperature sensor to detect overheating, the controller being configured to isolate the respective motor on detection of a failure.

The system could include a fast switching system that electrically disconnects a motor on the verge of destabilisation (outside predetermined limits) in the order of milliseconds, to prevent destabilising the other motor on that network.

A variety of power sources could be used to drive the generator, such as: a gas turbine with a power turbine driving the generator where virtually all the gas turbines power is converted to electrical power; a hybrid approach where some of the power from the gas turbine is converted to electrical and some directly to thrust via a fan or propeller. The gas turbine could have advanced features such as intercooling or recuperation used to optimise the engine for its reduced thrust requirements. In addition clearly an electrical hybrid approach could be used with energy storage or fuel cells are used to augment power delivered to the electrical system.

Aspects of any of the embodiments of the invention could be combined with aspects of other embodiments, where appropriate.

The invention claimed is:

1. An aircraft, comprising:
a variable pitch propulsor; and
an electrical network comprising:
   a wound field synchronous AC electrical generator having a wound rotor driven by an internal combustion engine;
   a voltage regulator configured to regulate an output voltage of the wound field synchronous AC electrical generator by varying an electrical current provided to a winding of the wound rotor to adjust magnetic field strength of the winding; and
   a synchronous AC drive motor coupled to the variable pitch propulsor and provided with power from an output of the wound field synchronous AC electrical generator.

2. The aircraft of claim 1, wherein the synchronous AC drive motor comprises a permanent magnet motor.

3. The aircraft of claim 1, wherein the electrical network comprises a frequency converter configured to convert an input frequency generated by the wound field synchronous AC generator to an output frequency provided to the synchronous AC drive motor.

4. The aircraft of claim 3, wherein the electrical network comprises a switching arrangement configurable to either of a starting position, in which the synchronous AC drive motor is electrically coupled to the electrical network via the frequency converter, and a drive position, in which the synchronous AC drive motor is directly electrically coupled to the wound field synchronous AC electrical generator.

5. The aircraft of claim 1, wherein the variable pitch propulsor comprises a variable pitch propeller.

6. The aircraft of claim 4, wherein the electrical network comprises a controller configured to control the electrical network such that, when in the starting position, the variable pitch propulsor is set to a fine pitch and the switching arrangement is configured to the starting position.

7. The aircraft of claim 3, wherein the frequency converter is electrically coupled to a plurality of synchronous AC drive motors.

8. The aircraft of claim 1, wherein the wound field synchronous AC electrical generator comprises a wound field generator with an exciter control system configured to vary the magnetic field strength of the rotor winding to control the output voltage of the wound field synchronous AC electrical generator.

9. The aircraft of claim 1, wherein the internal combustion engine comprises one of a gas turbine engine and a piston engine.

10. The aircraft of claim 1, comprising a plurality of variable pitch propulsors.

11. The aircraft of claim 1, wherein a stator of the wound field synchronous AC electrical generator comprises an equal number of magnetic poles as a stator of the synchronous AC drive motor.

12. A method of controlling the electrical network of the aircraft of claim 1, comprising:
modulating the output voltage of the wound field synchronous AC electrical generator to reduce a phase angle of induced EMF and current phasors in the synchronous AC drive motor.

13. A method of controlling the electrical network of the aircraft of claim 3, comprising:
operating the electrical network in one of a starting mode and a flight mode, wherein when in the starting mode, the synchronous AC drive motor is electrically coupled to the electrical network via the frequency converter and the variable pitch propulsor is set to fine pitch, and when in the drive mode, the synchronous AC drive motor is directly electrically coupled to the wound field synchronous AC electrical generator.

14. The method of claim 13, further comprising:
operating the electrical network in an inflight re-synchronisation mode, wherein stator windings of the synchronous AC drive motor are disconnected from the electrical network, rotor pitch is set such that the variable pitch propulsor is caused to rotate at a speed such that the motor is synchronised with the output frequency of the wound field synchronous AC electrical generator, and the stator windings are subsequently reconnected once the motor achieves synchronization.

* * * * *